US010734691B2

(12) United States Patent
Wang et al.

(10) Patent No.: US 10,734,691 B2
(45) Date of Patent: Aug. 4, 2020

(54) BATTERY PREHEATING METHODS, DEVICES, AND APPARATUS

(71) Applicant: SZ DJI TECHNOLOGY CO., LTD., Shenzhen (CN)

(72) Inventors: Wentao Wang, Shenzhen (CN); Yuancai Liu, Shenzhen (CN); Lei Wang, Shenzhen (CN); Juncheng Zhan, Shenzhen (CN); Sichao Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 163 days.

(21) Appl. No.: 15/640,014

(22) Filed: Jun. 30, 2017

(65) Prior Publication Data
US 2017/0301966 A1    Oct. 19, 2017

Related U.S. Application Data

(63) Continuation of application No. PCT/CN2014/095602, filed on Dec. 30, 2014.

(51) Int. Cl.
*H01M 10/615* (2014.01)
*H01M 10/48* (2006.01)
(Continued)

(52) U.S. Cl.
CPC ......... *H01M 10/615* (2015.04); *H01M 10/44* (2013.01); *H01M 10/486* (2013.01); *H01M 10/635* (2015.04); *H01M 10/6571* (2015.04); *H01M 10/0525* (2013.01); *H01M 10/625* (2015.04); *H01M 2220/20* (2013.01); *Y02E 60/122* (2013.01)

(58) Field of Classification Search
USPC .................................................. 320/134, 150
See application file for complete search history.

(56) References Cited

U.S. PATENT DOCUMENTS

2012/0017769 A1* 1/2012 Inoue ........................ F24C 7/08
99/331
2012/0315517 A1* 12/2012 Duff .................... H01M 2/1077
429/61
(Continued)

FOREIGN PATENT DOCUMENTS

CN    101867199 A    10/2010
CN    101976743 A    2/2011
(Continued)

OTHER PUBLICATIONS

The World Intellectual Property Organization (WIPO) International Search Report and Written Opinion for PCT/CN2014/095602 dated Oct. 28, 2015 10 Pages.
(Continued)

*Primary Examiner* — Robert Grant
(74) *Attorney, Agent, or Firm* — Anova Law Group, PLLC

(57) ABSTRACT

A method for preheating a battery includes acquiring an ambient temperature of a preheating zone, determining if the ambient temperature of the preheating zone satisfies a preset temperature condition, and, if the ambient temperature does not satisfy the preset temperature condition, controlling heating of the preheating zone until the ambient temperature satisfies the temperature condition.

20 Claims, 10 Drawing Sheets

(51) Int. Cl.
*H01M 10/44* (2006.01)
*H01M 10/635* (2014.01)
*H01M 10/6571* (2014.01)
*H01M 10/625* (2014.01)
*H01M 10/0525* (2010.01)

(56) References Cited

U.S. PATENT DOCUMENTS

| | | | | |
|---|---|---|---|---|
| 2014/0041826 | A1* | 2/2014 | Takeuchi | B60L 1/02 |
| | | | | 165/10 |
| 2014/0241394 | A1* | 8/2014 | Olson | G01N 3/60 |
| | | | | 374/8 |
| 2014/0308545 | A1* | 10/2014 | Tamakoshi | H01M 10/3909 |
| | | | | 429/50 |

FOREIGN PATENT DOCUMENTS

| | | |
|---|---|---|
| CN | 202423420 U | 9/2012 |
| CN | 103051026 A | 4/2013 |
| CN | 103490120 A | 1/2014 |
| CN | 103515674 A | 1/2014 |
| CN | 103825060 A | 5/2014 |
| CN | 204289654 U | 4/2015 |
| JP | S17004690 Y | 4/1942 |
| JP | S47027334 A | 3/1972 |
| JP | S5190430 U | 7/1976 |
| JP | S5482321 U | 6/1979 |
| JP | S5486320 U | 6/1979 |
| JP | S5512534 U | 1/1980 |
| JP | S55128271 A | 10/1980 |
| JP | H07226229 A | 8/1995 |
| JP | 2000277176 A | 10/2000 |
| JP | 2004327223 A | 11/2004 |
| JP | 2010097872 A | 4/2010 |
| JP | 2011083124 A | 4/2011 |
| JP | 2012044813 A | 3/2012 |
| JP | 2012104341 A | 5/2012 |
| JP | 2012243535 A | 12/2012 |
| JP | 2013084389 A | 5/2013 |
| JP | 2014157778 A | 8/2014 |
| JP | 2014194904 A | 10/2014 |
| WO | 2010092692 A1 | 8/2010 |
| WO | 2010119566 A1 | 10/2010 |

OTHER PUBLICATIONS

The World Intellectual Property Organization (WIPO), International Search Report and Written Opinion for PCT/CN2015/083864, dated Oct. 18, 2015, 16 pages.

* cited by examiner

BATTERY PREHEATING METHODS, DEVICES, AND APPARATUS

CROSS-REFERENCE TO RELATED APPLICATION

This is a continuation application of International Application No. PCT/CN2014/095602, filed on Dec. 30, 2014, the entire contents of which are incorporated herein by reference.

TECHNICAL FIELD

The present disclosure relates to the field of battery technologies, and in particular, to battery preheating methods, devices, and apparatuses.

BACKGROUND

Batteries, as a source of electric energy, can be mounted on a variety of devices to provide stable voltage and stable current for the devices, and achieve stable power supply for a longer time. With the development of science and technology, the structure of a battery becomes simpler and simpler, allowing for more ease for carrying and simpler and more convenient charging and discharging operations. A lithium-ion battery is a secondary battery (a battery that can be recharged multiple times). It mainly relies on the movement of lithium ions between positive electrodes and negative electrodes to operate. The lithium-ion battery is a representative of the modern high-performance batteries.

The battery life of a lithium-ion battery can be seriously affected when it is used in low-temperature environments. At present, it is not feasible to charge the lithium-ion battery at an ambient temperature below 0 degree, and it is not feasible to carry out fast-charging at an ambient temperature between 0 degree and 10 degrees. Otherwise, lithium precipitation can occur, causing the battery to fail and even accidents. During battery discharging, it is not feasible to discharge and use the lithium-ion battery at an ambient temperature below −20 degrees, and high current discharge between −20 degrees and 0 degree is not recommended. Otherwise, performance of the battery attenuates severely.

At present, there are no preheating or charging-heating-insulation devices for lithium-ion batteries. The existing preheating protection for lithium batteries is achieved generally by wrapping a heat source made up of heating resistors on the surface of a lithium battery, which forms a lithium battery that can be preheated. Not only does this type of lithium-ion batteries have a higher cost, but the temperature of the heat source covering the surface of the battery also cannot be well controlled, which can also damage the battery and affect its battery life.

SUMMARY

Embodiments of the present disclosure provide battery preheating methods, devices, and apparatuses, which can effectively provide preheating protection for a battery before its charging and discharging.

In one aspect, the embodiments of the present disclosure provide a battery preheating method, including: acquiring an ambient temperature of a preheating zone when preheating a battery; and if the ambient temperature of the preheating zone does not satisfy a preset temperature condition, adjusting a current temperature of the preheating zone until an ambient temperature of the preheating zone detected once again is in accordance with the temperature condition.

In some embodiments, before acquiring an ambient temperature of a preheating zone when preheating a battery, the method further includes: heating the preheating zone if a trigger event of preheating the battery is detected.

In some embodiments, detecting whether the trigger event of preheating the battery exists includes: detecting whether a battery to be preheated is loaded into the preheating zone; if yes, the trigger event of preheating the battery exists; or detecting whether a current is generated in a preheating circuit; if yes, the trigger event of preheating the battery exists; or detecting whether the ambient temperature of the preheating zone is increased; if yes, the trigger event of preheating the battery exists.

In some embodiments, the method further includes: before adjusting a current temperature of the preheating zone, determining whether preheating for the battery has been completed; and if yes, stopping the preheating, and otherwise, performing the adjustment of a current temperature of the preheating zone.

In some embodiments, determining whether preheating for the battery has been completed includes: determining whether a recorded preheating duration reaches a preset duration threshold; if yes, the preheating for the battery has been completed.

In some embodiments, determining whether preheating for the battery has been completed includes: determining whether an internal temperature of the battery acquired reaches a preset temperature threshold; if yes, the preheating for the battery has been completed.

In some embodiments, the battery is an intelligent battery that intelligently detects an internal temperature, and determining whether an internal temperature of the battery acquired reaches a preset temperature threshold includes: receiving an internal temperature of the battery detected by the battery; and determining whether the received internal temperature of the battery reaches the preset temperature threshold.

In some embodiments, adjusting a current temperature of the preheating zone includes: if the ambient temperature of the preheating zone acquired is less than a holding temperature threshold identified in the temperature condition, turning on heating for the preheating zone to adjust the temperature of the preheating zone to the holding temperature threshold; and if the ambient temperature of the preheating zone acquired is greater than the holding temperature threshold identified in the temperature condition, turning off heating for the preheating zone to adjust the temperature of the preheating zone to the holding temperature threshold.

In some embodiments, adjusting a current temperature of the preheating zone includes: if the ambient temperature of the preheating zone acquired is less than a minimum holding temperature threshold identified in the temperature condition, turning on heating for the preheating zone to adjust the temperature of the preheating zone to a holding temperature range identified by the temperature condition; and if the ambient temperature of the preheating zone acquired is greater than a maximum holding temperature threshold identified in the temperature condition, turning off heating for the preheating zone to adjust the temperature of the preheating zone to the holding temperature range identified by the temperature condition.

In some embodiments, acquiring an ambient temperature of a preheating zone when a battery is preheated includes: acquiring ambient temperatures in respective characteristic positions preset in the preheating zone when the battery is being preheated; and adjusting a current temperature of the preheating zone if the ambient temperature of the preheating zone does not satisfy a preset temperature condition includes: if there is a characteristic position where the ambient temperature does not satisfy the preset temperature condition, adjusting the temperature in the characteristic position where the preset temperature condition is not satisfied.

In some embodiments, the method further includes: after preheating for the battery is completed, turning on charging control of the battery if a charging trigger event of the battery is detected; and after preheating for the battery is completed, turning on discharging control of the battery if a discharging trigger event of the battery is detected.

In another aspect, the embodiments of the present disclosure further provide a battery preheating device, including: a heating module that heats a preheating zone; an acquisition module that acquires an ambient temperature of a preheating zone when a battery is being preheated; and a processing module connected to the heating module and configured to adjust a current temperature of the preheating zone until an ambient temperature of the preheating zone detected once again is in accordance with the temperature condition if the ambient temperature of the preheating zone does not satisfy a preset temperature condition.

In some embodiments, the processing module further controls the heating module to heat the preheating zone if a trigger event of preheating the battery is detected.

In some embodiments, the processing module detects whether a battery to be preheated is loaded into a preheating cavity where the preheating zone is located; if yes, the trigger event of preheating the battery exists; or detects whether a current is generated in a preheating circuit; if yes, the trigger event of preheating the battery exists; or detects whether the ambient temperature of the preheating zone is increased; if yes, the trigger event of preheating the battery exists.

In some embodiments, the processing module further determines whether preheating for the battery has been completed; and if yes, the processing module stops the preheating; otherwise, the processing module adjusts a current temperature of the preheating zone.

In some embodiments, the processing module determines whether a recorded preheating duration reaches a preset duration threshold; if yes, the preheating for the battery has been completed.

In some embodiments, the processing module determines whether an internal temperature of the battery acquired reaches a preset temperature threshold; if yes, the preheating for the battery has been completed.

In some embodiments, the processing module receives the internal temperature of the battery detected by the battery; and determines whether the received internal temperature of the battery reaches the preset temperature threshold.

In some embodiments, if the ambient temperature of the preheating zone acquired is less than a holding temperature threshold identified in the temperature condition, the processing module controls the heating module to turn on heating for the preheating zone to adjust the temperature of the preheating zone to the holding temperature threshold; and if the ambient temperature of the preheating zone acquired is greater than the holding temperature threshold identified in the temperature condition, the processing module controls the heating module to turn off heating for the preheating zone to adjust the temperature of the preheating zone to the holding temperature threshold.

In some embodiments, if the ambient temperature of the preheating zone acquired is less than a minimum holding temperature threshold identified in the temperature condition, the processing module controls the heating module to turn on heating for the preheating zone to adjust the temperature of the preheating zone to a holding temperature range identified by the temperature condition; and if the ambient temperature of the preheating zone acquired is greater than a maximum holding temperature threshold identified in the temperature condition, the processing module controls the heating module to turn off heating for the preheating zone to adjust the temperature of the preheating zone to the holding temperature range identified by the temperature condition.

In some embodiments, the processing module acquires ambient temperatures in respective characteristic positions preset in the preheating zone when the battery is being preheated; and if there is a characteristic position where the ambient temperature does not satisfy the preset temperature condition, the processing module adjusts the temperature in the characteristic position where the preset temperature condition is not satisfied.

In some embodiments, after preheating for the battery is completed, the processing module turns on charging control of the battery if a charging trigger event of the battery is detected; and after preheating for the battery is completed, the processing module turns on discharging control of the battery if a discharging trigger event of the battery is detected.

In another aspect, the embodiments of the present disclosure provide a battery preheating apparatus, including: a carrying member provided with an accommodating space, the accommodating space configured to accommodate a battery to be preheated; a heating member placed on the carrying member and configured to generate heat after powered-on; and a processor connected to the heating member and configured to control the heating member to generate heat; wherein the heat generated by the heating member can be transferred to the accommodating space.

In some embodiments, the carrying member is a heat conducting member.

In some embodiments, the heating member is placed on a surface of the heat conducting member, or embedded into the heat conducting member.

In some embodiments, the carrying member is a heat insulating member.

In some embodiments, the heating member is disposed on an inner surface of the carrying member; or the heating member is placed on an outer surface of the carrying member, and the outer surface of the carrying member includes a heat conducting hole in communication with the accommodating space.

In some embodiments, the heating member includes a heating film, which is attached to a surface of the carrying member.

In some embodiments, the heating member includes a heating wire, which is wound on the carrying member.

In some embodiments, the carrying member is a housing having an opening, and the battery can be received in the accommodating space from the opening.

In some embodiments, the battery preheating apparatus further includes a protective shell, the carrying member being installed in the protective shell.

In some embodiments, the battery preheating apparatus further includes a protective cover, the protective shell being provided with a mounting port, and the carrying member being received in the protective shell from the mounting port; and the protective cover being detachably fixed to the mounting port.

In some embodiments, the protective cover is flexibly connected to the protective shell through a connecting band; or the protective cover is rotatably connected to the protective shell; or the protective cover and the protective shell are connected via a snap fit connection.

In some embodiments, an inner surface of the protective shell includes a supporting portion, a peripheral edge of the opening of the carrying member includes a connecting portion, and the connecting portion is fixedly connected to the supporting portion directly or through a fastener.

In some embodiments, the battery preheating apparatus further includes an interfacing component fixed onto a peripheral edge of the opening of the carrying member.

In some embodiments, the interfacing component includes a power interface configured to be plugged into an electrical interface of the battery, and the power interface is electrically connected to the heating member.

In some embodiments, the interfacing component includes a communication interface configured to be in communication with the battery.

In some embodiments, the battery preheating apparatus further includes a power supply assembly, the power supply assembly being electrically connected to the heating member to supply power for the heating member, and/or the power supply assembly being electrically connected to the power interface to charge the battery.

In some embodiments, the power supply assembly is connected to an external power supply through a power line to provide power.

In some embodiments, the power supply assembly includes a battery pack that stores electric energy.

In some embodiments, the battery preheating apparatus may further include: one or more temperature sensors connected to the processor and configured to sense a preheating temperature of the battery to be preheated.

According to the embodiments of the present disclosure, the battery can be preheated as needed, and a preheating environment can be continuously monitored until the preheating ends, which not only can achieve effective preheating of the battery, but can also make adjustment of the preheating in accordance with the temperature of the preheating zone, thereby saving electric energy while performing the preheating, and also allowing for meeting the demands of automated and intelligent battery preheating.

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

According to the embodiments of the present disclosure, before a battery is charged or discharged (for powering a load), the battery may be received in a battery compartment, which can contain the battery and perform heating and heat preservation, and which advantageously allows for preheating a battery to be charged or discharged in the battery compartment, and intelligently making temperature adjustment during the preheating process, to finally adjust the temperature of the battery to be suitable for safe charging and discharging.

Figure 1:
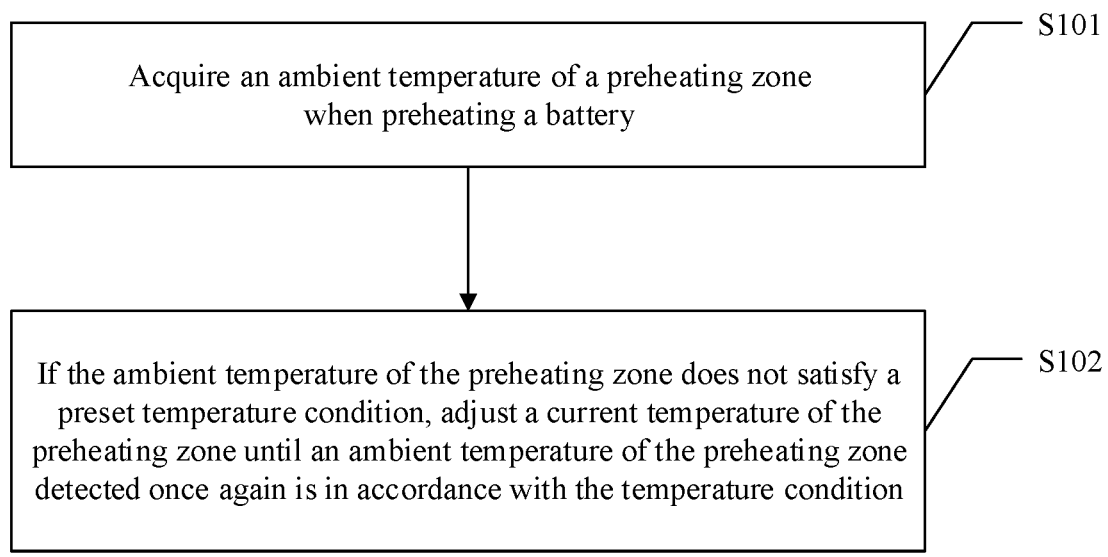
FIG. 1 is a flow chart of an exemplary battery preheating method, according to embodiments of the present disclosure.

FIG. 1 is a flow chart of a battery preheating method, according to embodiments of the present disclosure. The method consistent with embodiments of the present disclosure may be implemented by a controller that can perform temperature control. For example, the method according to the embodiments of the present disclosure includes:

S101: Acquire an ambient temperature of a preheating zone when preheating a battery.

Figure 9:
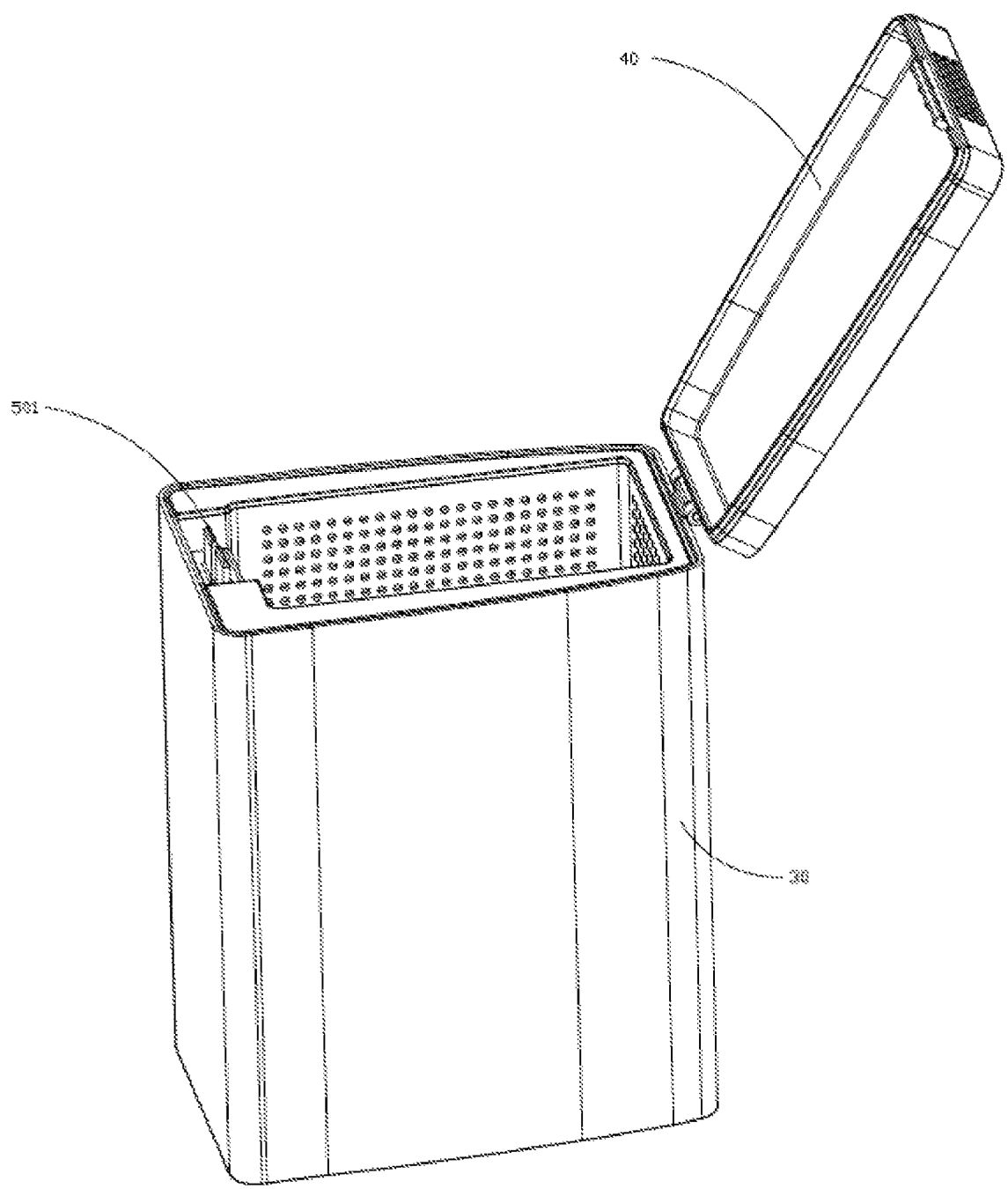
FIG. 9 is a perspective view of a battery preheating apparatus when its protective cover is open, according to embodiments of the present disclosure.

The preheating zone may refer to: a space enclosed by an internal chamber of an apparatus that can contain a battery to be preheated and perform heating and heat preservation. After a battery is inserted into the internal chamber, the space can be a sealed space to maintain a preheating temperature. FIG. 9 illustrates an example of the such space.

During the process of preheating the battery, a temperature sensor may be placed in the preheating zone to monitor and acquire, in real time, a temperature of the preheating zone, so as to control a heating assembly in accordance with the monitored or acquired temperature.

For example, before S101, the method may include a step of determining whether preheating is needed. This step acquires an ambient temperature of a current position using a temperature sensor or in a different manner, such as querying the current temperature through the Internet. When the ambient temperature is lower than a preset threshold (e.g., 0 degree), S101 is performed.

S102: If the ambient temperature of the preheating zone does not satisfy a preset temperature condition, adjust a current temperature of the preheating zone until an ambient temperature of the preheating zone detected once again is in accordance with the temperature condition.

Situations where the preset temperature condition is not satisfied include: the ambient temperature of the preheating zone is not within a temperature range identified by the temperature condition, that is, the ambient temperature is less than a minimum value identified by the temperature condition or greater than a maximum value identified by the temperature condition.

Adjusting a current temperature of the preheating zone includes: when the ambient temperature is less than the minimum value, increasing a heat supply temperature, and when the ambient temperature is greater than the maximum value identified by the temperature condition, decreasing the heat supply temperature. Decreasing the heat supply temperature typically employs a manner of disconnecting a heating power supply, to gradually reduce the temperature.

For example, when the ambient temperature is less than the minimum value, a heat supply assembly is turned on, and the heat supply assembly begins to operate to increase the temperature of the preheating zone. When the ambient temperature is greater than the maximum value, the heat supply assembly is turned off (e.g., by disconnecting the power supply), the heat supply assembly stops operating, and the temperature of the preheating zone stops increasing. The battery compartment corresponding to the preheating zone may be made of a heat preservation material to slow a speed at which heat is dissipated, thus saving electric energy.

The battery to be preheated may be used as a power supply, to supply power for the heat supply assembly of the battery compartment where the preheating zone is located. Alternatively, an external power supply may be used through a power line to supply power for the heat supply assembly of the battery compartment where the preheating zone is located. In addition, the battery compartment where the preheating zone is located may also include a battery assembly. This battery assembly not only may provide a power supply for preheating, but may also be employed as a backup power supply to charge the battery as needed after preheating of the battery to be preheated is completed.

After the temperature of the preheating zone reaches a temperature range identified by the temperature condition, heating may be stopped. Alternatively, after the temperature of the preheating zone reaches a temperature threshold identified by the temperature condition, heating is stopped. The temperature threshold may be set to be within the temperature range, e.g., a temperature threshold approximate to or equal to a maximum value in the temperature range.

In addition, the preheating zone may also refer to: a space enclosed by an internal chamber of a battery compartment of an aerial vehicle, an intelligent robot, etc. Before the battery is inserted to provide a power supply for the aerial vehicle, the intelligent robot, etc. (e.g., by discharging the battery), a preheating operation is performed, that is, S101 and S102 are performed. Monitoring and adjustment of the temperature of the preheating zone can be performed using a sensor, a controller (e.g., a flight controller, a mobile controller), installed on the apparatus, such as the aerial vehicle or the intelligent robot.

According to the embodiments of the present disclosure, the battery can be preheated as needed. A preheating environment can be continuously monitored until the preheating ends. This not only can achieve effective preheating of the battery, but can also make adjustment of the preheating in accordance with the temperature of the preheating zone, thereby saving electric energy while performing the preheating, and also allowing for meeting the demands for automated and intelligent battery preheating.

Figure 2:
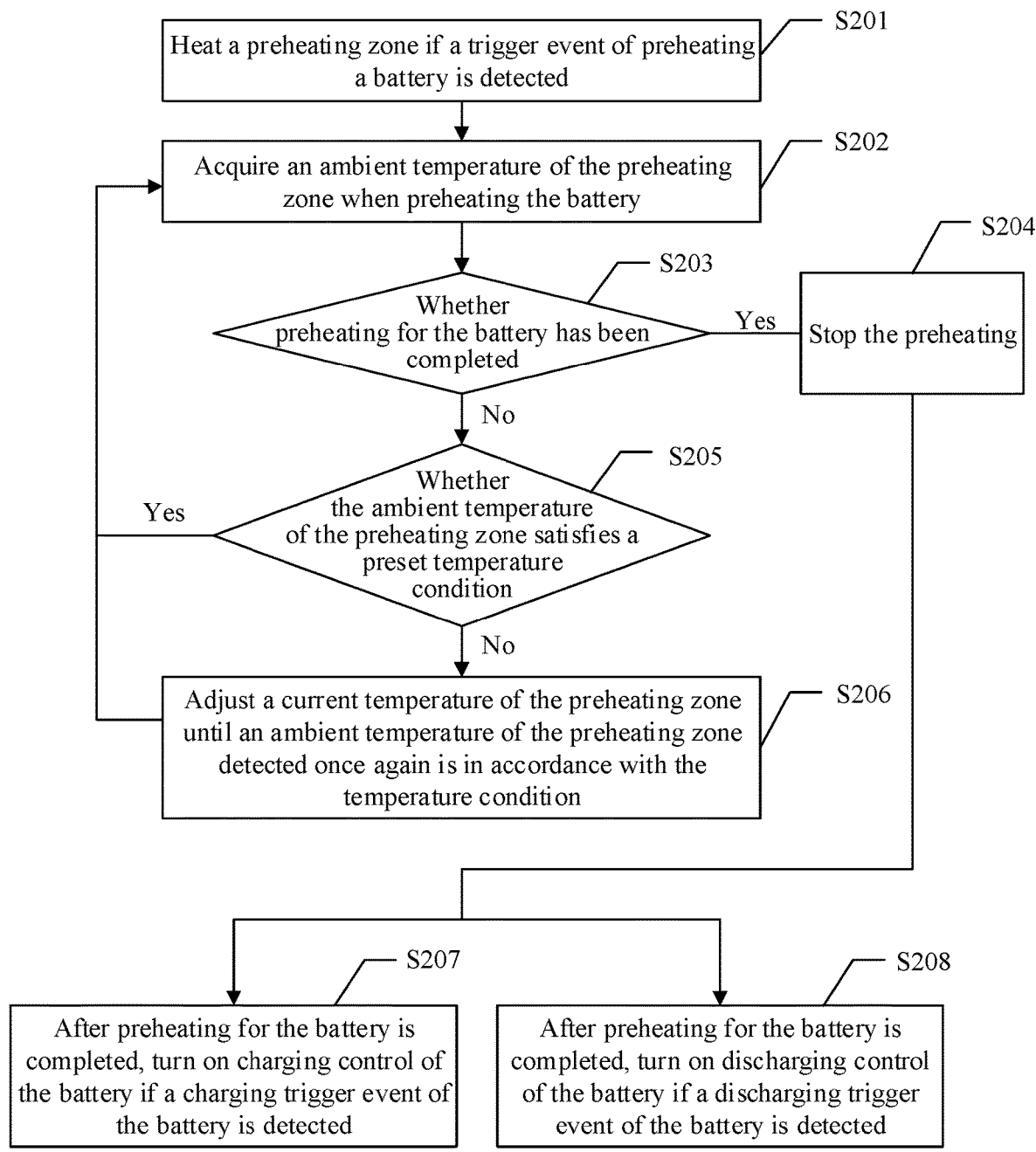
FIG. 2 is a flow chart of an exemplary battery preheating method, according to an embodiment of the present disclosure.

FIG. 2 is a flow chart of a battery preheating method, according to embodiments of the present disclosure. The method consistent with the embodiments of the present disclosure may be implemented by a controller that can perform temperature control. For example, the method according to the embodiments of the present disclosure includes:

S201: Heat a preheating zone when detecting a trigger event of preheating a battery.

For example, when an operation by a user to turn on a preheating function is detected, e.g., when a corresponding physical key is turned on, it may be determined that a trigger event of preheating the battery has occurred.

Detecting whether the trigger event of preheating the battery exists may also be achieved automatically, which may include: detecting whether a battery to be preheated is loaded into the preheating zone; if yes, the trigger event of preheating the battery exists. Whether the preheating zone includes a battery is determined through gravity sensing or distance sensing, and the following operations, such as ambient temperature detection and adjustment can begin.

Alternatively, detecting whether a battery to be preheated is loaded into the preheating zone may include: detecting whether a current is generated in a preheating circuit; if yes, the trigger event of preheating the battery exists. After the battery to be preheated is inserted into the preheating zone, the battery supplies power for a preheating circuit in a heat supply module. Once it is detected that a current is generated in the preheating circuit, it can be determined that the trigger event of preheating the battery exists, and the following operations, such as ambient temperature detection and adjustment begin.

Alternatively, detecting whether a battery to be preheated is loaded into the preheating zone may include: detecting whether the ambient temperature of the preheating zone is increased; if yes, the trigger event of preheating the battery exists. After the battery to be preheated is inserted into the preheating zone, the battery supplies power for a heat supply module, and begins to generate heat. At this point, when it is detected that the ambient temperature increases, it is determined that the trigger event of preheating the battery exists, and the following operations, such as ambient temperature detection and adjustment begin.

S202: Acquire an ambient temperature of the preheating zone when preheating the battery.

The ambient temperature of the preheating zone is detected and acquired based on one or more temperature sensors disposed in the preheating zone.

S203: Determine whether preheating for the battery has been completed.

For example, S203 may include: determining whether a preheating duration recorded reaches a preset duration threshold; if yes, the preheating for the battery has been completed.

The duration threshold may be determined after a statistical analysis is made based on a large amount of duration data of actual completion of preheating of batteries of corresponding types and volumes in environments at safe preheating temperatures. In the embodiments of the present disclosure, the preheating duration threshold may be within from 10 to 20 minutes.

Alternatively, S203 may include: determining whether an internal temperature of the battery acquired reaches a preset temperature threshold; if yes, the preheating for the battery has been completed.

The step of determining whether the preheating has been completed based on an internal temperature of the battery includes: receiving an internal temperature of the battery detected by the battery; and determining whether the received internal temperature of the battery reaches the preset temperature threshold. The battery may be an intelligent battery, which can detect a temperature of its battery core, e.g., a temperature at a center position inside the battery. When the internal temperature reaches or exceeds 5 degrees or other higher temperatures, the battery does not need to be preheated, where it is determined that the preheating has been completed.

If a result from the determination is that the preheating has been completed, the following S204 is performed, or the following S207 and S208 are directly performed. If the preheating has not been completed, the following S205 is performed.

S204: Stop the preheating. A preheating power supply is disconnected to stop the preheating. The user can also be prompted that the preheating has been completed in a suitable manner, such as making a sound or emitting light. The subsequent battery charging and discharging operations can be performed.

S205: Detect whether the ambient temperature of the preheating zone satisfies a preset temperature condition.

If the temperature condition is satisfied, go back to S202 to perform the temperature detection step once again, and if the temperature condition is not satisfied, perform the following S206.

S206: If the ambient temperature of the preheating zone does not satisfy the preset temperature condition, adjust a current temperature of the preheating zone, until an ambient temperature of the preheating zone detected once again is in accordance with the temperature condition.

After the ambient temperature is adjusted to satisfy the temperature condition, the process goes back to S202 to perform the temperature detection step once again.

During the heating process, the ambient temperature in the preheating zone is detected in real time, and whether the ambient temperature is in accordance with the temperature condition is determined in real time, so as to stop the heating in time, thereby achieving the goal of saving power and protecting the battery.

After the preheating ends, the user may be prompted that the preheating for the battery has been completed through a sound prompt, a light-emitting prompt, a vibration prompt, etc. The user can take out the battery, whose preheating has been completed, from the preheating zone to charge and discharge the battery for use. When the battery compartment corresponding to the preheating zone is configured as a charger or a discharger, the following steps can be performed to meet the demands of automation and intelligence for charging and discharging from the user. In the embodiments of the present disclosure, after the preheating has been completed, the following S207 and S208 may also be performed.

S207: After preheating for the battery is completed, turn on charging control of the battery if a charging trigger event of the battery is detected.

The charging operation on the battery whose preheating has been completed may include charging the battery, whose which preheating has been completed, through a large-capacity power supply configured in the preheating apparatus or an external power supply.

S208: After preheating of the battery is completed, turn on discharging control of the battery if a discharging trigger event of the battery is detected.

The discharging trigger event includes a control event generated when an apparatus, such as an aerial vehicle or a remotely controlled robot, receives a control signal, such as a movement signal. In actual operations, when the control signal, such as the movement signal is received, whether the preheating has been completed may be determined at first. If yes, S208 is performed to carry out discharging.

The discharging trigger event may also be a trigger event where the user clicks a button to trigger automatic discharging protection on the battery whose preheating has been completed. When the battery has a greater capacity, especially in a full charge capacity state, chemical activity of the battery is relatively high. If the battery is not used for a long time, it is easy to lead to ballooning, leakage, and other problems. In order to safely store the battery for a long time, the battery may be discharged according to the user's need, for which S208 can be performed.

In S206, adjusting a temperature of the preheating zone may include the following.

For example, if the ambient temperature of the preheating zone acquired is less than a holding temperature threshold identified in the temperature condition, heating for the preheating zone is turned on to adjust the temperature of the preheating zone to reach the holding temperature threshold.

If the ambient temperature of the preheating zone acquired is greater than the holding temperature threshold identified in the temperature condition, heating for the preheating zone is turned off to adjust the temperature of the preheating zone reach the holding temperature threshold.

Alternatively, S206 may include the following.

If the ambient temperature of the preheating zone acquired is less than a minimum holding temperature threshold identified in the temperature condition, heating for the preheating zone is turned on to adjust the temperature of the preheating zone to reach a holding temperature range identified by the temperature condition.

If the ambient temperature of the preheating zone acquired is greater than a maximum holding temperature threshold identified in the temperature condition, heating for the preheating zone is turned off to adjust the temperature of the preheating zone to reach the holding temperature range identified by the temperature condition.

Further, in order to increase temperature uniformity in the preheating zone, a temperature sensor may be configured to be at predetermined positions in the preheating zone to acquire ambient temperatures in different positions. At the same time, the heat supply assembly includes a plurality of heat supply blocks. A region where each predetermined position is located includes a heat supply block that can supply heat separately. For example, in S202, acquiring an ambient temperature of a preheating zone includes: acquiring ambient temperatures in respective characteristic positions predetermined in the preheating zone when the battery is being preheated. In this disclosure, the ambient temperature at a characteristic position is also referred to as a "local temperature." Correspondingly, in S206, adjusting a current temperature of the preheating zone includes: if there is a characteristic position where the ambient temperature does not satisfy the preset temperature condition, adjusting the temperature in the characteristic position where the preset temperature condition is not satisfied.

According to the embodiments of the present disclosure, the battery can be preheated as needed, and a preheating environment can be continuously monitored until the preheating ends, which not only can achieve effective preheating of the battery, but can also make adjustment of the preheating in accordance with the temperature of the preheating zone, thereby saving electric energy while performing the preheating, and also allowing for meeting the demands for automated and intelligent battery preheating.

The battery preheating devices and apparatuses consistent with the embodiments of the present disclosure are described in further detail below.

Figure 3:
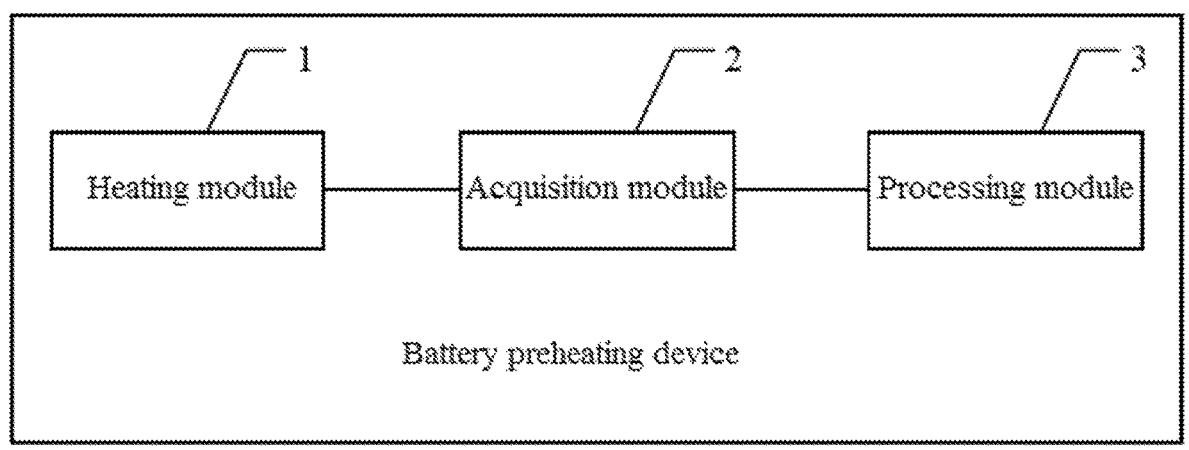
FIG. 3 is a schematic structural diagram of an exemplary battery preheating device, according to embodiments of the present disclosure.

FIG. 3 is a schematic diagram of a battery preheating device, according to embodiments of the present disclosure. The battery preheating device consistent with the embodiment of the present disclosure may be an independent preheating device, or may be internally built in mobile apparatuses, such as unmanned aerial vehicles and remotely controlled robots. The battery preheating device may include a battery compartment with the battery preheating functions described above in the embodiments of the present disclosure, or a combination of a battery compartment and a controller. For example, the battery preheating device includes:

a heating module 1, configured to heat a preheating zone;

an acquisition module 2, configured to acquire an ambient temperature of a preheating zone when a battery is being preheated; and a processing module 3, connected to the heating module 1, configured to adjust a current temperature of the preheating zone if the ambient temperature of the preheating zone does not satisfy a preset temperature condition, until an ambient temperature of the preheating zone detected once again is in accordance with the temperature condition.

The heating module 1 includes a heating circuit, and heats the preheating zone through a resistor disc, a resistance wire, etc.

Figure 5:
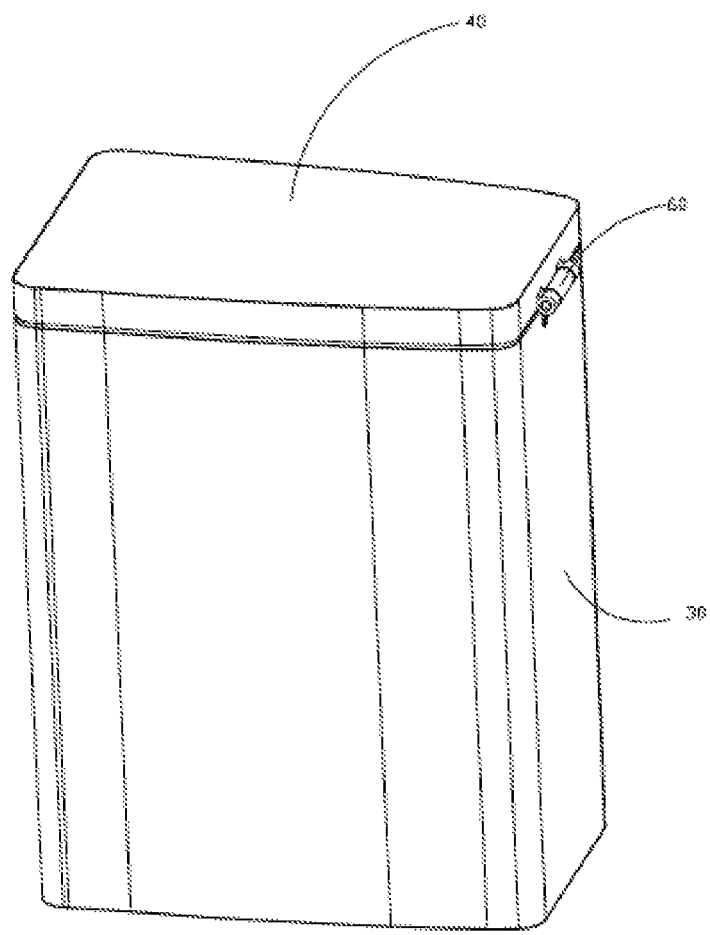
FIG. 5 is a perspective view of an exemplary battery preheating apparatus, according to embodiments of the present disclosure.
Figure 6:
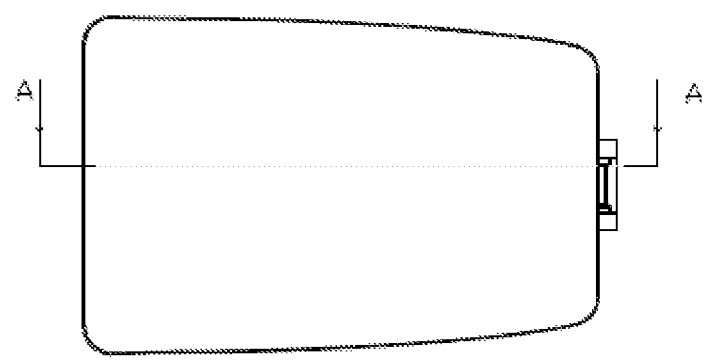
FIG. 6 is a top view of the battery preheating apparatus of FIG. 5.
Figure 7:
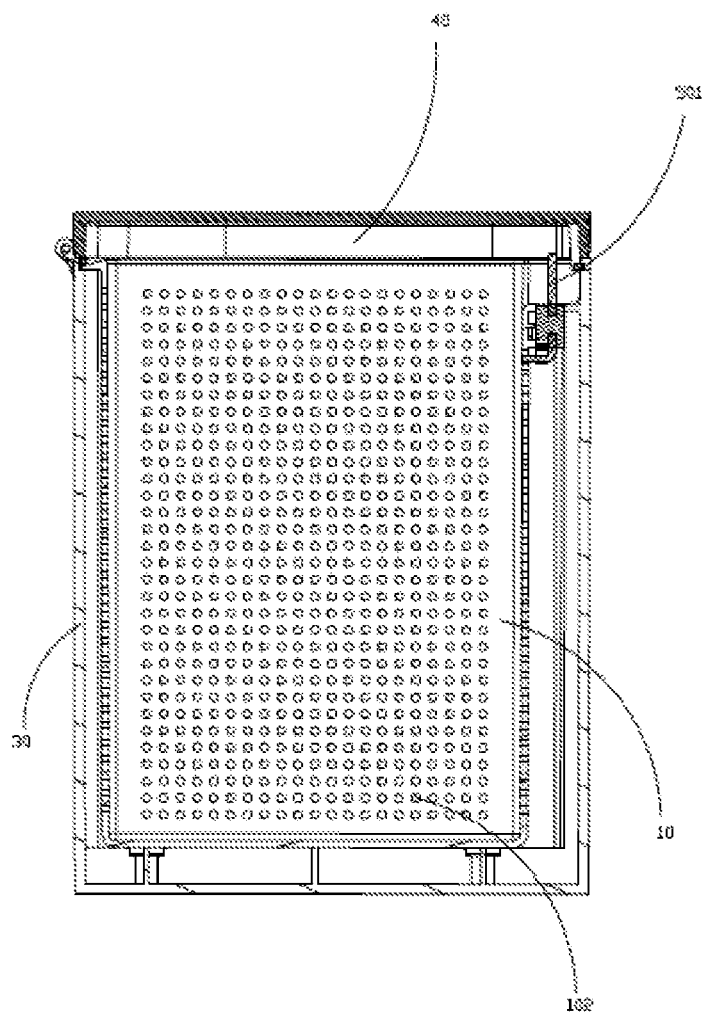
FIG. 7 is a cross-sectional view along an A-A line in FIG. 6.

The preheating zone monitored by the acquisition module 2 may refer to: a space enclosed by an internal chamber of an apparatus that can contain a battery to be preheated and can perform heating and heat preservation. After a battery is inserted into the internal chamber, the space can serve as a sealed space to maintain a preheating temperature. FIGS. 5-7 illustrate an example for the space.

During the process of preheating the battery, the acquisition module 2 can monitor and acquire, in real time, a temperature of a preheating zone through a temperature sensor placed in the preheating zone, so as to control a heating assembly in accordance with the monitored temperature.

The situations where the processing module 3 determines that the preset temperature condition is not satisfied includes: the ambient temperature of the preheating zone is not within a temperature range identified by the temperature condition, that is, the ambient temperature is less than a minimum value identified by the temperature condition or greater than a maximum value identified by the temperature condition.

Adjusting a current temperature of the preheating zone by the processing module 3 includes: when the ambient temperature is less than the minimum value, increasing a heat supply temperature through the heating module 1, and when the ambient temperature is greater than the maximum value identified by the temperature condition, decreasing the heat supply temperature. Decreasing the heat supply temperature typically employs a manner of disconnecting the power supply of the heating module 1 to gradually reduce the temperature.

For example, when the ambient temperature is less than the minimum value, the processing module 3 turns on the heating module 1, allowing the heating module 1 to begin to operate to increase the temperature of the preheating zone. When the ambient temperature is greater than the maximum value, the processing module 3 turns off the heating module 1 (e.g., by disconnecting the power supply), the heating module 1 stops operating, and the temperature of the preheating zone stops increasing. The battery compartment corresponding to the preheating zone may be made of a heat preservation material to slow a speed at which heat is dissipated, thus saving electric energy.

The battery to be preheated may be used as a power supply to supply power for the heat supply assembly of the battery compartment where the preheating zone is located. Alternatively, an external power supply may be used through a power line to supply power for the heating module 1. In addition, the battery compartment where the preheating zone is located may also include a battery assembly. This battery assembly not only can provide a power supply for preheating, but can also be employed as a backup power supply to charge the battery as needed after preheating of the battery to be preheated is completed.

After the temperature of the preheating zone reaches a temperature range identified by the temperature condition, the processing module 3 can stop the heating module 1 from heating. Alternatively, after the temperature of the preheating zone reaches a temperature threshold identified by the temperature condition, the heating module 1 is stopped from heating. The temperature threshold may be within the temperature range, and may be a temperature threshold approximate to or equal to a maximum value in the temperature range.

In addition, the preheating zone may also refer to: a space enclosed by an internal chamber of a battery compartment of an aerial vehicle, an intelligent robot, etc. Before the battery is inserted to provide a power supply for the aerial vehicle, the intelligent robot, etc. (e.g., discharging the battery), a related functional assembly (e.g., a controller, a heating plate, etc.) of the apparatus, such as the aerial vehicle or the intelligent robot, performs a preheating operation on the battery in the battery compartment.

In some embodiments, the processing module 3 is further configured to control the heating module 1 to heat the preheating zone if a trigger event of preheating the battery is detected. That is, whether to turn on a function of preheating the battery is automatically detected.

Further, when determining whether a trigger event of preheating the battery exists, the processing module 3 is configured to detect whether a battery to be preheated is loaded into a preheating cavity where the preheating zone is located; if yes, the trigger event of preheating the battery exists; or detect whether a current is generated in a preheating circuit. If yes, the trigger event of preheating the battery exists. Alternatively, the processing module 3 is configured to detect whether the ambient temperature of the preheating zone is increased; if yes, the trigger event of preheating the battery exists.

In some embodiments, the processing module 3 is further configured to determine whether preheating for the battery has been completed. If yes, the processing module 3 stops the preheating. Otherwise, the processing module 3 performs the adjustment of a current temperature of the preheating zone. If the preheating for the battery has been completed, the power supply for the heating module 1 is disconnected. Otherwise, the heating module 1 is controlled to provide heat to adjust the current temperature of the preheating zone.

In some embodiments, when determining whether the preheating has been completed, the processing module 3 is configured to determine whether a recorded preheating duration reaches a preset duration threshold. If yes, the preheating for the battery has been completed.

In some embodiments, when determining whether the preheating has been completed, the processing module 3 is configured to determine whether an internal temperature of the battery acquired reaches a preset temperature threshold. If yes, the preheating for the battery has been completed.

In some embodiments, when determining whether the preheating has been completed, the processing module 3 may also be configured to determine a preheating duration and an internal temperature of the battery at the same time, and when the preheating duration meets a preheating threshold or the internal temperature of the battery reaches a set temperature threshold, it can be determined that the preheating for the battery is completed.

In some embodiments, when the internal temperature of the battery is checked, the internal temperature may be detected and received through a communication interface by an intelligent battery The processing module 3 is configured to receive the internal temperature of the battery detected by the battery, and determine whether the received internal temperature of the battery reaches the preset temperature threshold.

In some embodiments, when adjusting the temperature of the preheating zone, if the ambient temperature of the preheating zone acquired is less than a holding temperature threshold identified in the temperature condition, the processing module 3 controls the heating module 1 to turn on heating for the preheating zone to adjust the temperature of the preheating zone to the holding temperature threshold. If the ambient temperature of the preheating zone acquired is greater than the holding temperature threshold identified in the temperature condition, the processing module 3 controls the heating module 1 to turn off heating for the preheating zone to adjust the temperature of the preheating zone to the holding temperature threshold.

In some embodiments, when adjusting the temperature of the preheating zone, if the ambient temperature of the preheating zone acquired is less than a minimum holding temperature threshold identified in the temperature condition, the processing module 3 is configured to control the heating module 1 to turn on heating for the preheating zone to adjust the temperature of the preheating zone to a holding temperature range identified by the temperature condition; and if the ambient temperature of the preheating zone acquired is greater than a maximum holding temperature threshold identified in the temperature condition, the processing module 3 is configured to control the heating module 1 to turn off heating for the preheating zone to adjust the temperature of the preheating zone to the holding temperature range identified by the temperature condition.

During the adjustment, the processing module 3 is configured to acquire ambient temperatures in respective characteristic positions preset in the preheating zone when the battery is being preheated. If there is a characteristic position where the ambient temperature does not satisfy the preset temperature condition, the processing module 3 adjusts the temperature in the characteristic position where the preset temperature condition is not satisfied.

In some embodiments, after completion of the preheating, if a charging trigger event of the battery is detected, the processing module 3 is further configured to turn on charging control of the battery; and if a discharging trigger event of the battery is detected, the processing module 3 is configured to turn on discharging control of the battery.

Reference can be made to the description of related steps in the method embodiments of FIG. 1 and FIG. 2 for exemplary implementation of the heating module 1, the acquisition module 2, and the processing module 3, which are not repeated herein.

According to the embodiments of the present disclosure, the battery can be preheated as needed, and a preheating environment can be continuously monitored until the preheating ends, which not only can achieve effective preheating of the battery, but can also make adjustment of the preheating in accordance with the temperature of the preheating zone, thereby saving electric energy while performing the preheating, and also allowing for meeting demands for automated and intelligent battery preheating.

An exemplary battery preheating apparatus consistent with embodiments of the present disclosure is describe below in detail with reference to FIGS. 4-10.

Figure 4:
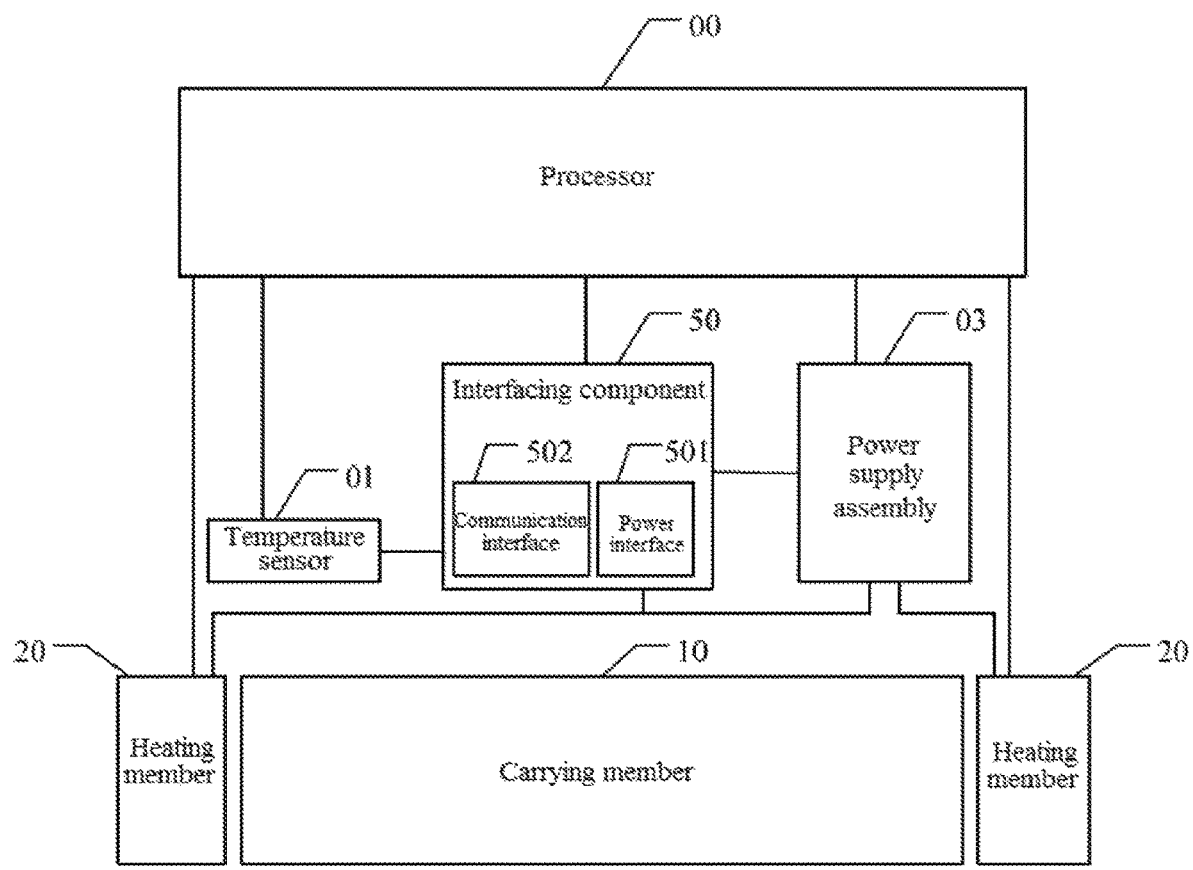
FIG. 4 is a schematic structural diagram of an exemplary battery preheating apparatus, according to embodiments of the present disclosure.

FIG. 4 is a schematic structural diagram of a battery preheating apparatus, according to embodiments of the present disclosure. The battery preheating apparatus includes: a carrying member 10, a heating member 20, and a processor 00. The carrying member 10 includes an accommodating space configured to accommodate a battery to be preheated. The heating member 20 is disposed on the carrying member 10 and can generate heat after powered-on. The heat generated by the heating member 20 can be transferred to the accommodating space, and the accommodating space forms a preheating zone that preheats the battery.

For example, a memory may also be included. The memory stores a preheating program. The processor 00 calls a preheating program stored in the memory, and is configured to acquire an ambient temperature of a preheating zone when a battery is being preheated. If the ambient temperature of the preheating zone does not satisfy a preset temperature condition, the processor 00 controls the heating member 20 to adjust a current temperature of the preheating zone until an ambient temperature of the preheating zone detected once again is in accordance with the temperature condition.

In some embodiments, the processor 00 is further configured to control heating of the preheating zone if a trigger event of preheating the battery is detected.

In some embodiments, the processor 00, when detecting whether a trigger event of preheating the battery exists, is configured to detect whether a battery to be preheated is loaded into the preheating zone; if yes, the trigger event of preheating the battery exists. The processor 00 may detect whether a current is generated in a preheating circuit; if yes, the trigger event of preheating the battery exists. The processor 00 may detect whether the ambient temperature of the preheating zone is increased; if yes, the trigger event of preheating the battery exists.

In some embodiments, before being configured to adjust a current temperature of the preheating zone, the processor 00, is further configured to determine whether preheating for the battery has been completed; and if yes, stop the preheating; otherwise, perform the adjustment of a current temperature of the preheating zone.

In some embodiments, the processor 00, when used to determine whether preheating for the battery has been completed, is configured to determine whether a recorded preheating duration reaches a preset duration threshold; if yes, the preheating for the battery has been completed.

In other embodiments, the processor 00, when used to determine whether preheating for the battery has been completed, is configured to determine whether an internal temperature of the battery acquired reaches a preset temperature threshold; if yes, the preheating for the battery has been completed.

In other embodiments, the battery is an intelligent battery that intelligently detects an internal temperature. The processor 00, when used to determine whether an internal temperature of the battery acquired reaches a preset temperature threshold, is configured to receive internal temperature of the battery detected by the battery; and configured to determine whether the received internal temperature of the battery reaches the preset temperature threshold.

In some embodiments, the processor 00 may be used to adjust a current temperature of the preheating zone. If the ambient temperature of the preheating zone acquired is less than a holding temperature threshold identified in the temperature condition, the processor 00 is configured to turn on heating for the preheating zone to adjust the temperature of the preheating zone to the holding temperature threshold. If the ambient temperature of the preheating zone acquired is greater than the holding temperature threshold identified in the temperature condition, temperature condition, the processor 00 is configured to turn off heating for the preheating zone to adjust the temperature of the preheating zone to the holding temperature threshold.

In other embodiments, if the ambient temperature of the preheating zone acquired is less than a minimum holding temperature threshold identified in the temperature condition, the processor 00 is configured to turn on heating for the preheating zone to adjust the temperature of the preheating zone to a holding temperature range identified by the temperature condition. If the ambient temperature of the preheating zone acquired is greater than a maximum holding temperature threshold identified in the temperature condition, the processor 00 is configured to turn off heating for the preheating zone to adjust the temperature of the preheating zone reach the holding temperature range identified by the temperature condition.

In other embodiments, the processor 00 is configured to acquire ambient temperatures in respective characteristic positions preset in the preheating zone when the battery is being preheated. If there is a characteristic position where the ambient temperature does not satisfy the preset temperature condition, the temperature in the characteristic position where the preset temperature condition is not satisfied is adjusted.

The battery preheating apparatus consistent with the embodiments of the present disclosure may further include a plurality of temperature sensors 01. The processor 00 is connected to temperature sensors 01 disposed in respective positions to acquire ambient temperatures of the preheating zone detected by the sensors, thereby achieving the temperature adjustment.

In some embodiments, after preheating for the battery is completed the processor 00 is further configured to turn on charging control of the battery if a charging trigger event of the battery is detected. Additionally or alternatively, after preheating for the battery is completed, the processor 00 is further configured to turn on discharging control of the battery if a discharging trigger event of the battery is detected.

As described herein, reference can be made to the specific implementation of various related steps in the method embodiments described above for specific operations of the processor 00.

Figure 8:
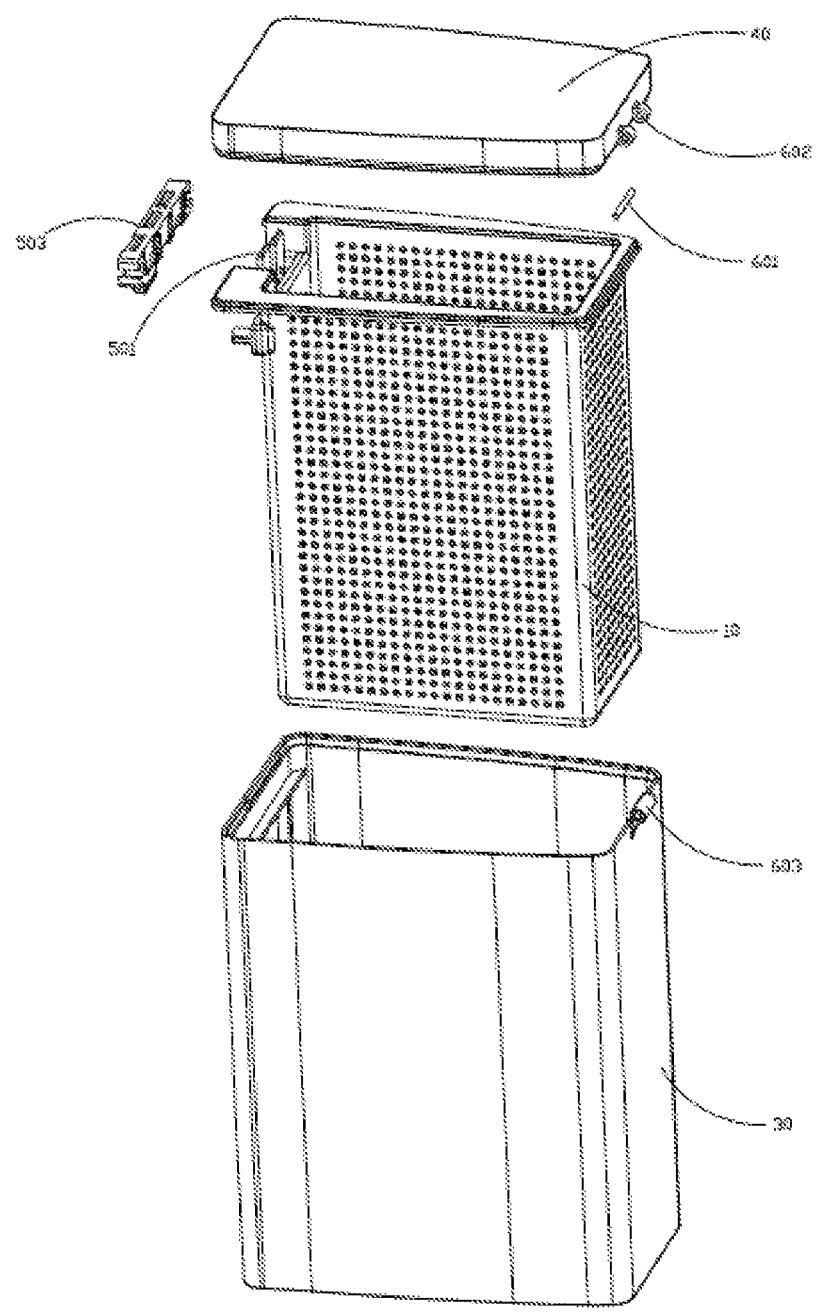
FIG. 8 is an exploded view of the battery preheating apparatus of FIG. 5.
Figure 10:
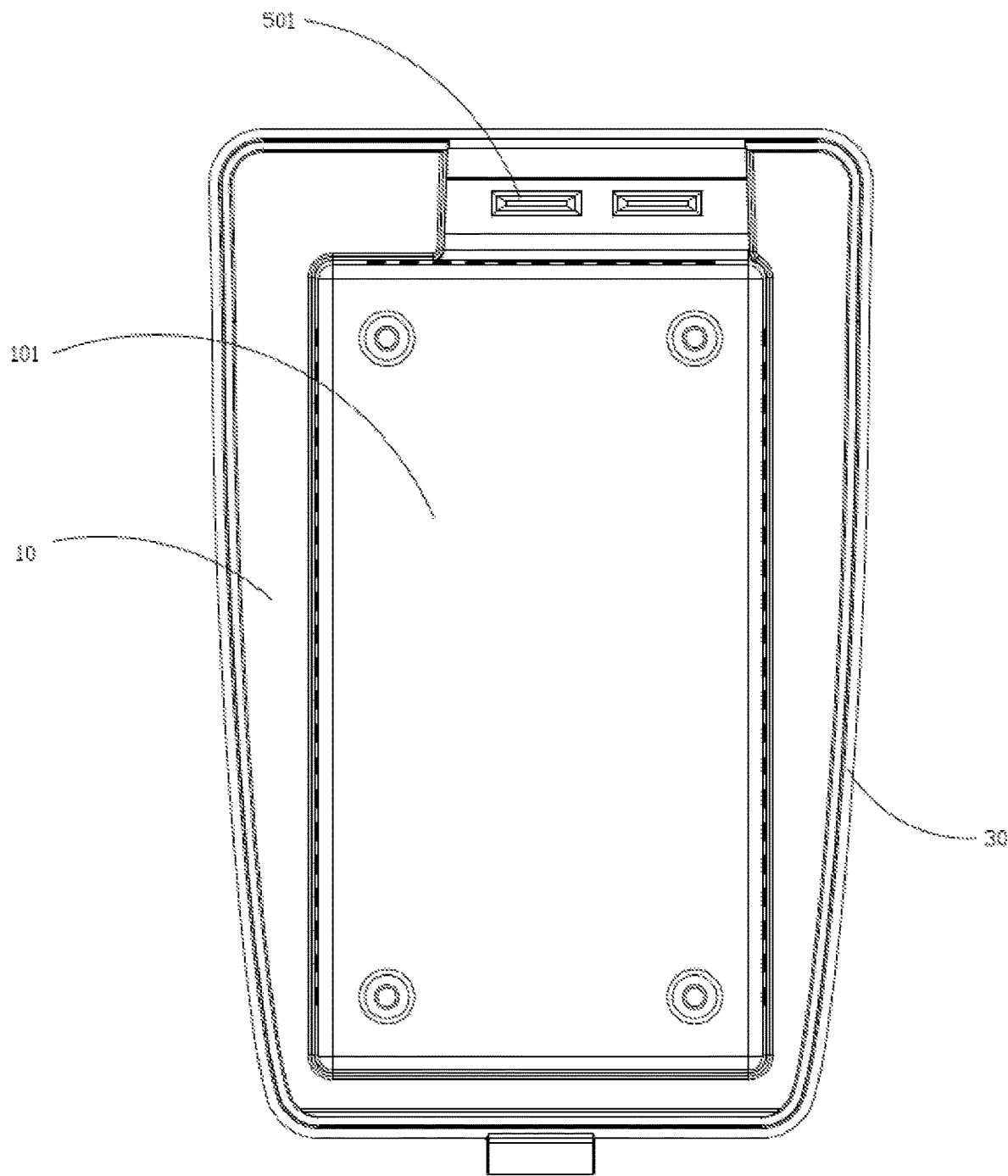
FIG. 10 is a top view of an internal structure of a battery preheating apparatus when the protective cover is removed, according to embodiments of the present disclosure.

FIG. 5 is a schematic structural diagram of a battery preheating apparatus, according to embodiments of the present disclosure. FIG. 6 is a top view of the battery preheating apparatus of FIG. 5. FIG. 7 is a cross-sectional view along an A-A line of FIG. 6. FIG. 8 is an exploded view of the battery preheating apparatus of FIG. 5. FIG. 9 is a perspective view of a battery preheating apparatus when its protective cover is open. FIG. 10 is a top view of an internal structure of a battery preheating apparatus when the protective cover is open.

The battery preheating apparatus consistent with the embodiments of the present disclosure is a separate apparatus having a battery preheating function. The apparatus includes: a carrying member 10 having an accommodating space 101, the accommodating space 101 being configured to accommodate a battery to be preheated; a heating member 20 disposed on the carrying member 10 and can generate heat after powered-on. The heat generated by the heating member 20 can be transferred to the accommodating space 101. The heat transferred to the accommodating space 101 is configured to preheat a battery inserted into the accommodating space 101.

In some embodiments, the carrying member 10 may be a heat conducting member, which may be made of various metals that can transfer heat. When the heating member 20 is powered on and begins to give out heat, the heat is transferred to the accommodating space 101 through the heat conducting member. The heating member 20 may be disposed on a surface of the heat conducting member, or embedded into the heat conducting member.

Alternatively, the carrying member 10 may also be a heat insulating member. In this case, the heating member 20 may be disposed on an inner surface of the carrying member 10. The heating member 20 may alternatively be disposed on an outer surface of the carrying member 10, and the outer surface of the carrying member 10 has a heat conducting hole 102 in communication with the accommodating space 101. For example, as shown in FIGS. 7-8, the carrying member 10 may be made of plastics whose surface has a plurality of heat conducting holes 102 (e.g., through holes). When the heating member 20 is powered on and begins to give out heat, the heat is transferred to the accommodating space 101 through the heat conducting holes 102. As described herein, the preheating for the battery typically needs to increase an internal temperature of the battery to be equal to or above 5 degrees (the target temperature can be set as needed by the user) or higher temperatures. The heating member 20 that can generate substantial heat may not be necessary. Therefore, the heating member 20 would not damage an object made of plastics and serving as the carrying member 10, and would not consume too much electricity.

In some embodiments, the heating member 20 includes a heating film, which is attached to a surface of the carrying member 10. To achieve electric heating, the heating film is electrically connected to a battery to be preheated in the accommodating space 101 or an external power supply through a corresponding heating circuit and a power interface 501. Additionally or alternatively, the heating member 20 may also be a heating wire, which is wound on the carrying member 10. The heating member 20 may include a heating film and a heating wire at the same time, such that they can be disposed in different positions to generate preheating heat respectively.

In some embodiments, the carrying member 10 is a housing having an opening. The battery can be received in the accommodating space 101 from the opening.

In some embodiments, the battery preheating apparatus further includes a protective shell 30, and the carrying member 10 is installed in the protective shell 30. The protective shell 30 may be a metal or plastic shell, and a temperature preservation layer may be placed between the protective shell 30 and the carrying member 10 (or the heating member 20) to maximize preservation of the temperature generated by the heating member 20.

In some embodiments, the battery preheating apparatus further includes a protective cover 40. The protective shell 30 includes a mounting port, and the carrying member 10 can be received in the protective shell 30 from the mounting port. The protective cover 40 is detachably fixed to the mounting port.

In some embodiments, the protective cover 40 is flexibly connected to the protective shell 30 through a connecting band. In other embodiments, the protective cover 40 and the protective shell 30 are connected via a snap fit connection. In other embodiments, the protective cover 40 is rotatably connected to the protective shell 30. FIGS. 5-8 illustrate a structure 60 that provides a rotary connection between the protective cover 40 and the protective shell 30. The structure 60 includes: a rotary shaft 601, protrusions 602 disposed on the protective cover 40, and a shaft barrel 603 disposed on the protective shell 30. The rotary shaft 601 passes through the protrusions 602 and the shaft barrel 603 to achieve the rotary connection between the protective cover 40 and the protective shell 30.

In some embodiments, an inner surface of the protective shell 30 includes a supporting portion. A peripheral edge of the opening of the carrying member 10 includes a connecting portion, and the connecting portion is fixedly connected to the supporting portion directly or through a fastener.

In some embodiments, the battery preheating apparatus may further include: an interfacing component 50 fixed onto a peripheral edge of the opening of the carrying member 10. The interfacing component 50 may include a power interface 501 that can be plugged into an electrical interface of the battery. The power interface 501 is electrically connected to the heating member 20. The interfacing component 50 may further include a communication interface 502 configured to be in communication with the battery. As shown in FIG. 8, a protective holder 503 may be configured on the power interface 501 to increase the stability for fixing the power interface 501 onto the opening of the carrying member 10.

In some embodiments, the battery preheating apparatus may further include: a power supply assembly 03, the power supply assembly 03 being electrically connected to the heating member 20 to supply power for the heating member 20, and/or the power supply assembly 03 being electrically connected to the power interface 501 to charge the battery.

Additionally, the power supply assembly 03 is connected to an external power supply through a power line to provide power.

The power supply assembly 03 may be a battery pack configured to store electric energy, and include corresponding circuits, for example, a charging circuit, a power supply circuit, various protection circuits, etc.

According to embodiments of the present disclosure, the battery can be preheated as needed, and a preheating environment can be continuously monitored until the preheating ends, which not only can achieve effective preheating of the battery, but can also make adjustment of the preheating in accordance with the temperature of the preheating zone, thereby saving electric energy while performing the preheating, and also allowing for meeting demands for automated and intelligent battery preheating.

In the embodiments provided in the present disclosure, it should be recognized that the devices and methods disclosed may be implemented through other manners. For example, the device embodiments described above are merely illustrative, division of the modules or units may be division of logical functions, and division in another manner may exist in actual implementation. For example, a plurality of units or assemblies may be combined or integrated into another system, or some features may be omitted or not performed. In addition, the indirect coupling, direct coupling, and/or communication connections illustrated or described may be implemented by using other suitable interfaces. The indirect coupling or communication connections between the devices or units may be implemented electrically, mechanically, or in another suitable form.

The units described as separate components may or may not be physically separate, and components illustrated as units may or may not be physical units, may be located in one position, or may be distributed on a plurality of network units. Some or all of the units may be selected as needed to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, all or a part of the technical solutions of the present disclosure may be implemented in a form of a software product. The computer software product is stored in a storage medium, and includes one or more instructions for instructing a computer processor to perform all or a part of the steps of the methods described in the embodiments of the present disclosure. The aforementioned storage medium includes: any suitable non-transitory computer-readable medium that can store program codes, such as a USB flash drive, a removable hard disk, a Read-Only Memory (ROM), a Random Access Memory (RAM), a magnetic disk, or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A method for preheating a battery, comprising:
    detecting whether the battery is loaded into an accommodating space of a carrying member;
    acquiring an ambient temperature of the accommodating space;
    determining if the ambient temperature of the accommodating space satisfies a preset temperature condition; and
    in response the battery being loaded into the accommodating space and the ambient temperature not satisfying the preset temperature condition, controlling a heating member to heat the accommodating space until the ambient temperature satisfies the temperature condition, wherein the heating member is disposed over the carrying member and configured to generate heat after powered-on.

2. The method of claim 1, further comprising, before controlling the heating of the accommodating space:
    determining whether preheating of the battery has completed; and stopping, if the preheating of the battery has completed, the preheating, and controlling, if the preheating of the battery has not completed, the heating of the accommodating space.

3. The method of claim 2, wherein determining whether the preheating for the battery has completed comprises:
determining whether a recorded preheating duration reaches a preset duration threshold, wherein the preheating for the battery has completed if the recorded preheating duration reaches the preset duration threshold.

4. The method of claim 2, wherein determining whether preheating for the battery has completed comprises:
determining whether an internal temperature of the battery reaches a preset temperature threshold, wherein the preheating for the battery has been completed if the internal temperature of the battery reaches the preset temperature threshold.

5. The method of claim 4, wherein determining whether the internal temperature of the battery reaches the preset temperature threshold comprises:
receiving the internal temperature of the battery detected by the battery; and
determining whether the received internal temperature of the battery reaches the preset temperature threshold.

6. The method of claim 1, wherein controlling the heating of the accommodating space comprises:
if the ambient temperature is lower than a holding temperature threshold indicated in the temperature condition, turning on heating for the accommodating space to adjust the ambient temperature to the holding temperature threshold; and
if the ambient temperature is equal to or higher than the holding temperature threshold, turning off heating for the accommodating space to adjust the ambient temperature to the holding temperature threshold.

7. The method of claim 1, wherein controlling the heating of the accommodating space comprises:
if the ambient temperature is lower than a minimum holding temperature threshold indicated in the temperature condition, turning on heating for the accommodating space to adjust the ambient temperature to a temperature within a holding temperature range indicated by the temperature condition; and
if the ambient temperature is higher than a maximum holding temperature threshold indicated in the temperature condition, turning off heating for the accommodating space to adjust the ambient temperature to the holding temperature range indicated by the temperature condition.

8. The method of claim 1, wherein:
acquiring the ambient temperature comprises:
acquiring local temperatures in respective characteristic positions preset in the preheating zone; and
controlling heating of the accommodating space comprises:
adjusting the local temperature in a characteristic position where the preset temperature condition is not satisfied.

9. The method of claim 1, further comprising, after preheating for the battery is completed:
turning on a charging control of the battery if a charging trigger event of the battery is detected; and
turning on a discharging control of the battery if a discharging trigger event of the battery is detected.

10. A battery preheating apparatus, comprising:
a carrying member having an accommodating space, the accommodating space being configured to receive a battery to be preheated;
a heating member disposed over the carrying member and configured to generate heat after powered-on; and
a processor coupled to the heating member and configured to
determine whether the battery is loaded into the accommodating space;
determine whether an ambient temperature of the accommodating space satisfies a preset temperature condition; and
in response the battery being loaded into the accommodating space and the ambient temperature not satisfying the preset temperature condition, control the heating member to heat the accommodating space until the ambient temperature satisfies the temperature condition.

11. The battery preheating apparatus according to claim 10, wherein the processor is further configured to:
determine whether a recorded preheating duration reaches a preset duration threshold; and
in response to the recorded preheating duration reaching a preset duration threshold, control the heating member to stop heating the preheating zone.

12. The battery preheating apparatus according to claim 10, wherein the processor is further configured to:
determine whether an internal temperature of the battery reaches a preset temperature threshold; and
in response to the internal temperature of the battery reaching the preset temperature threshold, control the heating member to stop heating the preheating zone.

13. The apparatus of claim 10,
wherein an outer surface of the carrying member includes one or more heat conducting holes in communication with the accommodating space.

14. The apparatus of claim 10, wherein the carrying member includes a heat conducting member.

15. The apparatus of claim 10, wherein the carrying member includes a heat insulating member.

16. The apparatus of claim 10, wherein the heating member comprises a heating film attached to a surface of the carrying member.

17. The apparatus of claim 10, wherein the heating member comprises a heating wire wound on the carrying member.

18. The apparatus of claim 10, wherein the carrying member includes a housing having an opening, the opening being configured to allow the battery to enter into the accommodating space.

19. The apparatus of claim 18, further comprising:
a protective shell, the carrying member being installed in the protective shell.

20. The apparatus of claim 13, wherein the one or more heat conducting holes are through holes.

* * * * *